(12) United States Patent
Bellman et al.

(10) Patent No.: US 11,577,992 B2
(45) Date of Patent: Feb. 14, 2023

(54) METHODS AND APPARATUS FOR FORMING SHAPED ARTICLES, SHAPED ARTICLES, METHODS FOR MANUFACTURING LIQUID LENSES, AND LIQUID LENSES

(71) Applicant: CORNING INCORPORATED, Corning, NY (US)

(72) Inventors: Robert Alan Bellman, Ithaca, NY (US); David Francis Dawson-Elli, Charlotte, NC (US); Shiwen Liu, Painted Post, NY (US); Chuanche Wang, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 316 days.

(21) Appl. No.: 16/754,655

(22) PCT Filed: Oct. 12, 2018

(86) PCT No.: PCT/US2018/055629
§ 371 (c)(1),
(2) Date: Apr. 8, 2020

(87) PCT Pub. No.: WO2019/075340
PCT Pub. Date: Apr. 18, 2019

(65) Prior Publication Data
US 2020/0262162 A1     Aug. 20, 2020

Related U.S. Application Data

(60) Provisional application No. 62/572,182, filed on Oct. 13, 2017.

(51) Int. Cl.
*C03C 17/02* (2006.01)

(52) U.S. Cl.
CPC ................................. *C03C 17/02* (2013.01)

(58) Field of Classification Search
CPC ...................................................... C03C 17/02
(Continued)

(56) References Cited

U.S. PATENT DOCUMENTS 4,330,572 A * 5/1982 Frosch .................... C03C 17/02
427/372.2
6,261,975 B1  7/2001 Xia et al.
(Continued)

FOREIGN PATENT DOCUMENTS

CN     101636345 A    1/2010
CN     103322994 A    9/2013
(Continued)

OTHER PUBLICATIONS

CN-109417031-A , Levesque D W (Year: 2019).*
(Continued)

*Primary Examiner* — Betelhem Shewareged

(57) ABSTRACT

A method includes depositing a surface modification layer on sidewalls of a plurality of cavities of a shaped article. The surface modification layer is formed from a glass material including a mobile component. The shaped article is formed from a glass material, a glass ceramic material, or a combination thereof. At least a portion of the mobile component is migrated from the surface modification layer into surface regions of the sidewalls of the shaped article, whereby subsequent to the migration, the surface regions have a reduced annealing point compared to a bulk of the shaped article. The surface modification layer and the surface regions of the sidewalls are reflowed. A surface roughness of the surface modification layer disposed on the sidewalls following the reflowing is less than a surface roughness of the sidewalls prior to the depositing.

20 Claims, 9 Drawing Sheets

(58) Field of Classification Search
USPC .......................................................... 428/210
See application file for complete search history.

(56) References Cited

U.S. PATENT DOCUMENTS

| | | | |
|---|---|---|---|
| 9,656,909 | B2 | 5/2017 | Burket et al. |
| 2006/0284201 | A1 | 12/2006 | Goh |
| 2010/0068107 | A1* | 3/2010 | Tanguy ............... B81C 1/00206 422/236 |
| 2011/0183118 | A1 | 7/2011 | Lamberson et al. |
| 2012/0216570 | A1 | 8/2012 | Abramov et al. |
| 2014/0347741 | A1 | 11/2014 | Karam et al. |
| 2015/0197455 | A1 | 7/2015 | Pranov |
| 2017/0121209 | A1 | 5/2017 | Dannoux et al. |
| 2017/0283298 | A1 | 10/2017 | Hawtof et al. |
| 2020/0262162 | A1* | 8/2020 | Bellman ................. C03C 17/02 |

FOREIGN PATENT DOCUMENTS

| | | |
|---|---|---|
| EP | 186976 B1 | 2/1991 |
| EP | 1927576 A1 | 6/2008 |
| WO | 2011/094076 A2 | 8/2011 |

OTHER PUBLICATIONS

Chinese Patent Application No. 201880066729.5, Office Action dated Jul. 30, 2021, 5 pages (English Translation Only), Chinese Patent Office.

Fluegel; "Glass Viscosity Calculatio Based On a Global Statistical Modelling Approach"; Glass Technol.: Eur. J. Glass Sci. Technol. A; 48 (1) (2007) pp. 13-30.

International Search Report and Written Opinion of the International Searching Authority; PCT/US208/055629; dated Feb. 1, 2019; 11 Pages; Korean Intellectual Property.

* cited by examiner

METHODS AND APPARATUS FOR FORMING SHAPED ARTICLES, SHAPED ARTICLES, METHODS FOR MANUFACTURING LIQUID LENSES, AND LIQUID LENSES

CROSS-REFERENCE TO RELATED APPLICATIONS

This application claims the benefit of priority under 35 U.S.C. § 371 of International Application No. PCT/US2018/055629, filed on Oct. 12, 2018, which claims the benefit of priority under 35 U.S.C. § 119 of U.S. Provisional Application No. 62/572,182, filed Oct. 13, 2017, the content of each of which is incorporated herein by reference in its entirety.

BACKGROUND

Field

This disclosure relates to methods and apparatus for forming shaped articles, which can be used to manufacture liquid lenses.

Technical Background

Isothermal glass pressing generally includes pressing a glass plate at a relatively low temperature (e.g., a temperature at which the glass has a relatively high viscosity of $10^{10}$ poise to $10^{12}$ poise) using a polished ceramic or metallic mold. Such high viscosity of the glass helps to prevent the glass from sticking to the mold and to maintain the surface quality of the finished article. The mold complexity and relatively high pressing force generally limits isothermal glass pressing to small glass articles with simple geometries (e.g., ophthalmic lenses).

SUMMARY

Disclosed herein are methods and apparatus for forming shaped articles, shaped articles, methods of manufacturing liquid lenses, and liquid lenses.

Disclosed herein is a method comprising depositing a surface modification layer on sidewalls of a plurality of cavities of a shaped article. The surface modification layer is formed from a glass material comprising a mobile component. The shaped article is formed from a glass material, a glass-ceramic material, or a combination thereof. At least a portion of the mobile component is migrated from the surface modification layer into surface regions of the sidewalls of the shaped article, whereby subsequent to the migration, the surface regions have a reduced annealing point compared to a bulk of the shaped article. The surface modification layer and the surface regions of the sidewalls are reflowed. A surface roughness of the surface modification layer disposed on the sidewalls following the reflowing is less than a surface roughness of the sidewalls prior to the depositing.

Disclosed herein is a shaped article comprising a plate formed from a glass material, a glass-ceramic material, or a combination thereof. A plurality of cavities is formed in the plate. A surface modification layer is disposed on sidewalls of the plurality of cavities. The surface modification layer is formed from a glass material comprising a mobile component. Doped regions of the plurality of cavities adjacent the surface modification layer comprise a gradient in a concentration of the mobile component.

Disclosed herein is a liquid lens comprising a lens body comprising a first window, a second window, a cavity disposed between the first window and the second window, and a surface modification layer disposed on a sidewall of the cavity. The lens body comprises a glass material, a glass-ceramic material, or a combination thereof. The surface modification layer comprises a glass material comprising a mobile component. A doped region of the cavity adjacent the surface modification layer comprises a gradient in a concentration of the mobile component. A first liquid and a second liquid are disposed within the cavity of the lens body. The first liquid and the second liquid are substantially immiscible with each other and have different refractive indices such that an interface between the first liquid and the second liquid forms a lens.

Disclosed herein is a method of manufacturing a liquid lens, the method comprising depositing a surface modification layer on sidewalls of a plurality of cavities of a shaped article. The surface modification layer is formed from a glass material comprising a mobile component. The shaped article is formed from a glass material, a glass-ceramic material, or a combination thereof. The surface modification layer is heated to a heating temperature for a heating time sufficient to migrate at least a portion of the mobile component from the surface modification layer into surface regions of the sidewalls of the shaped article such that, subsequent to the migration, the surface regions have a reduced annealing point compared to a bulk of the shaped article. A first liquid and a second liquid are deposited in each of the plurality of cavities of the shaped article. The first liquid and the second liquid are substantially immiscible with each other and have different refractive indices such that an interface between the first liquid and the second liquid forms a lens. A cap is bonded to a surface of the shaped article to seal the first liquid and the second liquid within the plurality of cavities of the shaped article and form a liquid lens array.

It is to be understood that both the foregoing general description and the following detailed description are merely exemplary, and are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Figure 1:
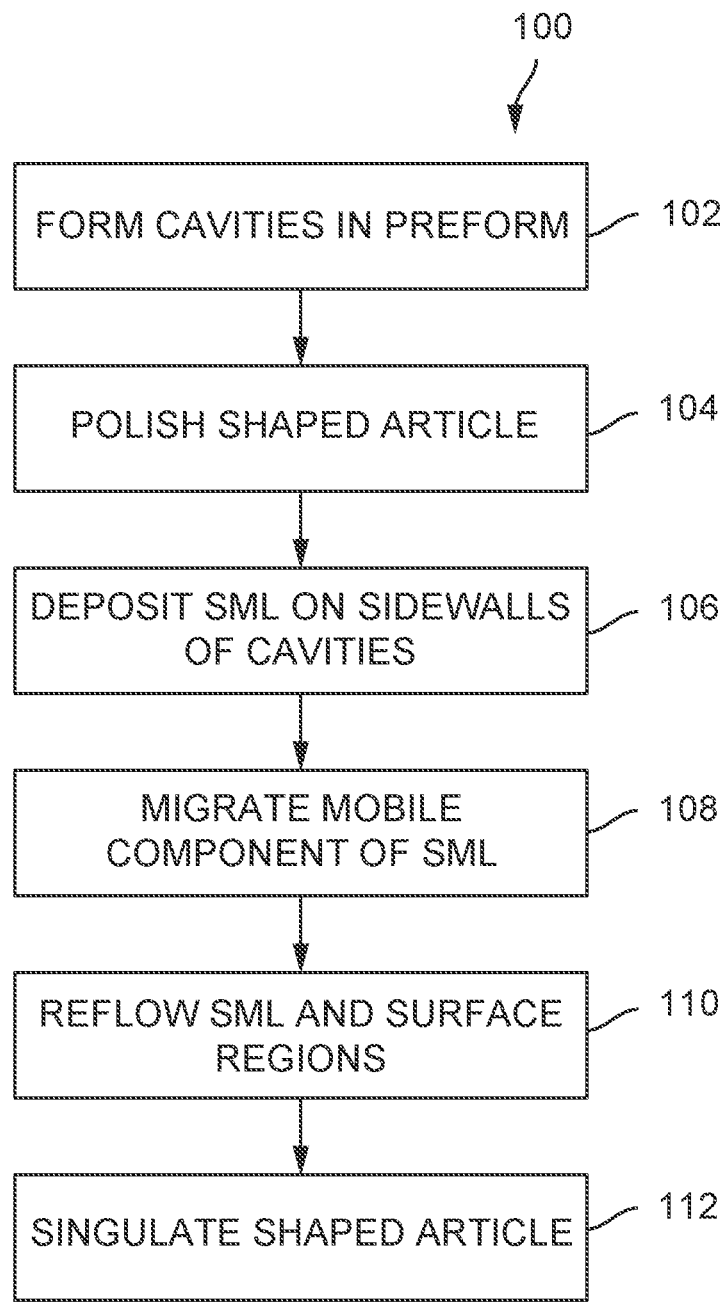
FIG. 1 is a flowchart representing some embodiments of a method for forming a shaped article.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

Numerical values, including endpoints of ranges, can be expressed herein as approximations preceded by the term "about," "approximately," or the like. In such cases, other embodiments include the particular numerical values. Regardless of whether a numerical value is expressed as an approximation, two embodiments are included in this disclosure: one expressed as an approximation, and another not expressed as an approximation. It will be further understood that an endpoint of each range is significant both in relation to another endpoint, and independently of another endpoint.

As used herein, the term "average coefficient of thermal expansion," or "average CTE," refers to the average coefficient of linear thermal expansion of a given material between 0° C. and 300° C. As used herein, the term "coefficient of thermal expansion," or "CTE," refers to the average coefficient of thermal expansion unless otherwise indicated. The CTE can be determined, for example, using the procedure described in ASTM E228 "Standard Test Method for Linear Thermal Expansion of Solid Materials With a Push-Rod Dilatometer" or ISO 7991:1987 "Glass— Determination of coefficient of mean linear thermal expansion."

As used herein, the term "surface roughness" means Ra surface roughness determined as described in ISO 25178, Geometric Product Specifications (GPS)—Surface texture: areal, filtered at 25 µm unless otherwise indicated. The surface roughness values reported herein were obtained using a Keyence confocal microscope.

As used herein, the term "formed from" can mean one or more of comprises, consists essentially of, or consists of. For example, a component that is formed from a particular material can comprise the particular material, consist essentially of the particular material, or consist of the particular material.

In various embodiments, a method comprises depositing a surface modification layer on sidewalls of a plurality of cavities of a shaped article. The surface modification layer is formed from a glass material comprising a mobile component. The shaped article is formed from a glass material, a glass-ceramic material, or a combination thereof. In some embodiments, at least a portion of the mobile component is migrated from the surface modification layer into surface regions of the sidewalls of the shaped article, whereby subsequent to the migration, the surface regions have a reduced annealing point compared to a bulk of the shaped article. In some embodiments, the surface modification layer and the surface regions of the sidewalls are reflowed. A surface roughness of the surface modification layer disposed on the sidewalls following the reflowing is less than a surface roughness of the sidewalls prior to the depositing.

The methods described herein can enable production of relatively large shaped articles having cavities with reduced sidewall roughness compared to conventional pressing, laser cutting, and/or etching methods.

The methods described herein can be used to manufacture shaped articles with smooth cavities formed therein. For example, in various embodiments, a shaped article comprises a plate formed from a glass material, a glass-ceramic material, or a combination thereof and a plurality of cavities formed in the plate. In some embodiments, a surface modification layer is disposed on sidewalls of the plurality of cavities. The surface modification layer is formed from a glass material comprising a mobile component. In some embodiments, doped regions of the plurality of cavities adjacent the surface modification layer comprise a gradient in a concentration of the mobile component.

The methods described herein can be used to manufacture liquid lenses. For example, in various embodiments, a liquid lens comprises a lens body comprising a first window, a second window, a cavity disposed between the first window and the second window, and a surface modification layer disposed on a sidewall of the cavity. The lens body comprises a glass material, a glass-ceramic material, or a combination thereof. The surface modification layer is formed from a glass material comprising a mobile component. In some embodiments, a doped region of the cavity adjacent the surface modification layer comprises a gradient in a concentration of the mobile component. A first liquid and a second liquid are disposed within the cavity of the lens body. The first liquid and the second liquid are substantially immiscible with each other and have different refractive indices such that an interface between the first liquid and the second liquid forms a lens.

In various embodiments, a method of manufacturing a liquid lens comprises depositing a surface modification layer on sidewalls of a plurality of cavities of a shaped article. The surface modification layer is formed from a glass material comprising a mobile component. The shaped article is formed from a glass material, a glass-ceramic material, or a combination thereof. In some embodiments, the surface modification layer is heated to a heating temperature for a heating time sufficient to migrate at least a portion of the mobile component from the surface modification layer into surface regions of the sidewalls of the shaped article such that, subsequent to the migration, the surface regions have a reduced annealing point compared to a bulk of the shaped article. A first liquid and a second liquid are deposited in each of the plurality of cavities of the shaped article. The first liquid and the second liquid are substantially immiscible with each other and have different refractive indices such that an interface between the first liquid and the second liquid forms a lens. In some embodiments, a cap is bonded to a surface of the shaped article to seal the first liquid and the second liquid within the plurality of cavities of the shaped article and form a liquid lens array.

FIG. 1 is a flowchart representing some embodiments of a method 100 for forming a shaped article. In some embodiments, method 100 comprises forming a plurality of cavities in a preform at step 102.

Figure 2:
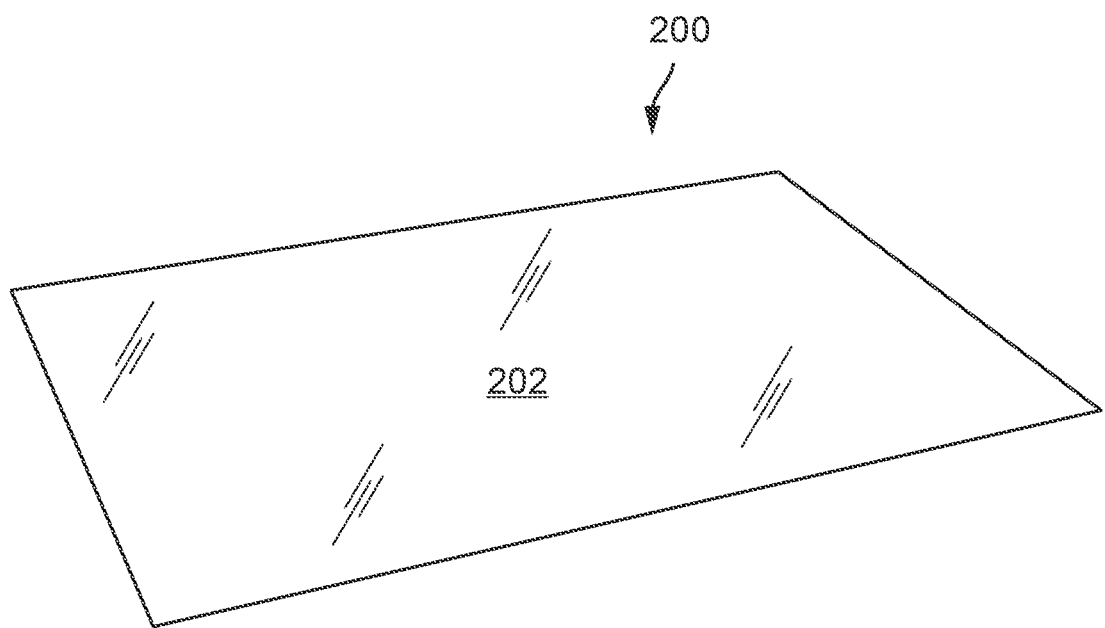
FIG. 2 is a perspective view of some embodiments of a preform that can be used to form a shaped article.
Figure 3:
FIG. 3 is a cross-sectional view of the preform shown in FIG. 2.

FIG. 2 is a perspective view of some embodiments of a preform 200, and FIG. 3 is a cross-sectional view of the preform. In some embodiments, preform 200 is configured as a sheet or plate. For example, preform 200 comprises a first surface 202 and a second surface 204 substantially parallel to the first surface. A thickness of preform 200 is a distance between first surface 202 and second surface 204. In some embodiments, preform 200 has a rectangular circumferential or perimetrical shape as shown in FIG. 2. In other embodiments, the preform can have a triangular, circular, elliptical, or other polygonal or non-polygonal circumferential or perimetrical shape. For example, the preform can be a wafer having a substantially circular circumferential shape and with or without a reference flat disposed on an outer circumference or perimeter of the preform. In some embodiments, first surface 202 of preform 200 has a surface area of at least about 100 cm$^2$, at least about 200 cm$^2$, at least about 300 cm$^2$, at least about 400 cm$^2$, at least about 500 cm$^2$, at least about 600 cm$^2$, at least about 700 cm$^2$, at least about 800 cm$^2$, at least about 900 cm$^2$, at least about 1000 cm$^2$, at least about 1100 cm$^2$, at least about 1200 cm$^2$, at least about 1300 cm$^2$, at least about 1400 cm$^2$, or at least about 1500 cm$^2$. For example, preform 200 can be a 6 inch wafer with a surface area of about 121.55 cm$^2$, an A6 plate with a surface area of about 155.4 cm$^2$, an 8 inch wafer with a surface area of about 162.15 cm$^2$, an A5 plate with a surface area of about 310.8 cm$^2$, an A4 plate with a surface area of about 623.7 cm$^2$, an A3 plate with a surface area of about 1247.4 cm$^2$, or another suitably sized preform with a suitable surface area. In some embodiments, preform 200 is formed from a glass material, a glass-ceramic material, or a combination thereof. For example, preform 200 is a glass sheet or plate.

In some embodiments, the forming the plurality of cavities comprises pressing the plurality of cavities in the preform using a mold. Additionally, or alternatively, the forming the plurality of cavities comprises cutting the plurality of cavities in the preform using a laser. Additionally, or alternatively, the forming the plurality of cavities comprises etching the plurality of cavities in the preform using an etchant. The ability to use glass pressing, laser cutting, and/or etching techniques to form the plurality of cavities can be enabled by the methods described herein. For example, depositing a surface modification layer onto sidewalls of the cavities can enable use of cavities formed by glass pressing, laser cutting, and/or etching processes that produce sidewalls with relatively rough surfaces that may be unsuitable for use in electrowetting applications.

Figure 4:
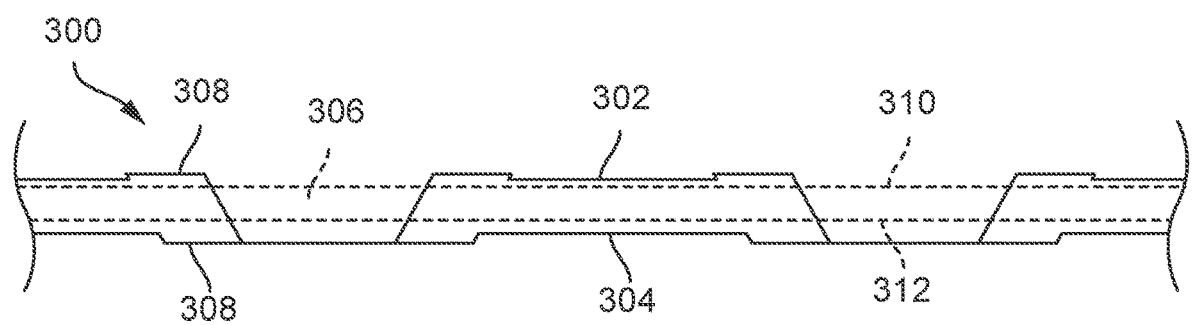
FIG. 4 is a partial cross-sectional schematic view of some embodiments of a shaped article following forming a plurality of cavities.

FIG. 4 is a partial cross-sectional schematic view of some embodiments of a shaped article 300 following the forming the plurality of cavities. Shaped article 300 comprises a first surface 302 corresponding to first surface 202 of preform 200 and a second surface 304 opposite the first surface and corresponding to second surface 204 of the preform. In some embodiments, shaped article 300 comprises a plurality of cavities 306 formed in first surface 302 (e.g., formed by mold features during pressing and/or by laser cutting). In some embodiments, cavities 306 are blind holes that do not extend entirely through shaped article 300 as shown in FIG. 4. Thus, cavities 306 comprise an open end at first surface 302 of shaped article 300 and a closed end near second surface 304 of the shaped article. In other embodiments, the cavities are through-holes extending entirely through the shaped article.

In some embodiments, following the forming the plurality of cavities, shaped article 300 comprises one or more raised portions 308 disposed on one or more surfaces of the shaped article as shown in FIG. 4. For example, such raised portions 308 can result from flow of material of preform 200 during pressing. Thus, in various embodiments, first surface 302 and/or second surface 304 are non-planar following the forming the cavities.

Figure 5:
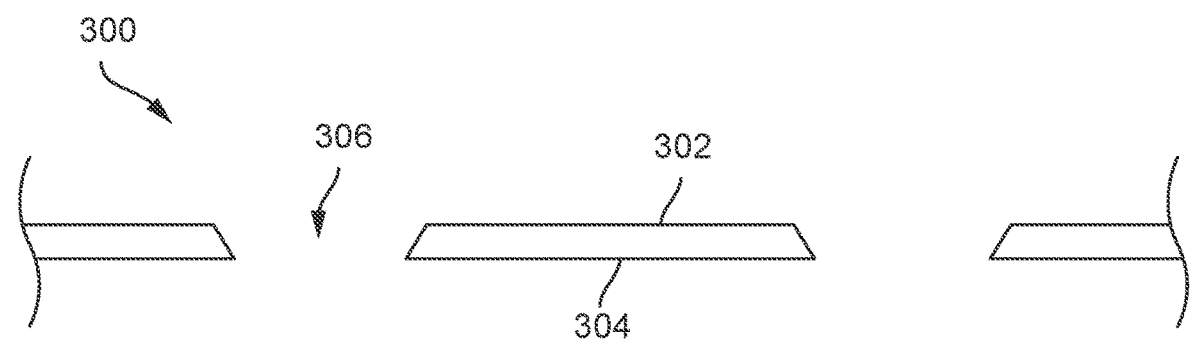
FIG. 5 is a partial cross-sectional schematic view of some embodiments of a shaped article following polishing.

In some embodiments, method 100 comprises polishing the shaped article at step 104 as shown in FIG. 1. For example, polishing shaped article 300 comprises polishing at least one of first surface 302 of the shaped article or second surface 304 of the shaped article following the forming the cavities. FIG. 5 is a cross-sectional schematic view of some embodiments of shaped article 300 following the polishing. In some embodiments, the polishing comprises removing material from first surface 302 of shaped article 300. For example, the polishing comprises removing material from first surface 302 down to dashed line 310 shown in FIG. 4. Such polishing can remove raised portions 308 on first surface 302, resulting in a substantially planar surface, excluding cavities 306, as shown in FIG. 5. In some embodiments, the polishing comprises removing material from second surface 304 of shaped article 300. For example, the polishing comprises removing material from second surface 304 down to dashed line 312 shown in FIG. 4. Such polishing can remove raised portions 308 on second surface 304, resulting in a substantially planar surface, excluding cavities 306, as shown in FIG. 5. The polishing can be achieved by mechanical grinding, chemical etching, thermal treatment, or another suitable polishing process. Mechanical grinding can be beneficial in enabling removal of material from the surfaces of the shaped article without altering the sidewalls of the cavities, which can help to preserve the shape and/or surface quality of the sidewalls as described herein.

In some embodiments, after the forming cavities 306 and prior to the polishing, the cavities of shaped article 300 comprise blind holes as shown in FIG. 4 and described herein. In some of such embodiments, the polishing opens the blind holes to transform the plurality of cavities 306 into a plurality of through-holes as shown in FIG. 5. For example, the polishing removes the closed end of the blind holes to open the blind holes and form the through-holes.

In some embodiments, a thickness of shaped article 300 (e.g., a distance between first surface 302 and second surface 304), before or after polishing, can be at most about 5 mm, at most about 4 mm, at most about 3 mm, at most about 2 mm, at most about 1 mm, at most about 0.9 mm, at most about 0.8 mm, at most about 0.7 mm, at most about 0.6 mm, or at most about 0.5 mm. Additionally, or alternatively, the thickness of shaped article 300, before or after polishing, can be at least about 0.1 mm, at least about 0.2 mm, at least about 0.3 mm, at least about 0.4 mm, at least about 0.5 mm, at least about 0.7 mm, at least about 0.7 mm, at least about 0.8 mm, at least about 0.9 mm, or at least about 1 mm.

Figure 6:
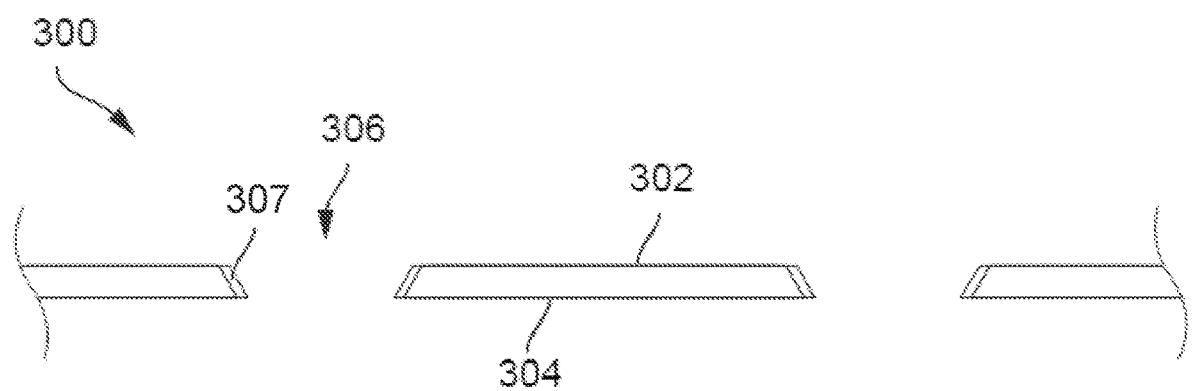
FIG. 6 is a partial cross-sectional schematic view of some embodiments of a shaped article comprising a surface modification layer deposited on sidewalls of a plurality of cavities.
Figure 7:
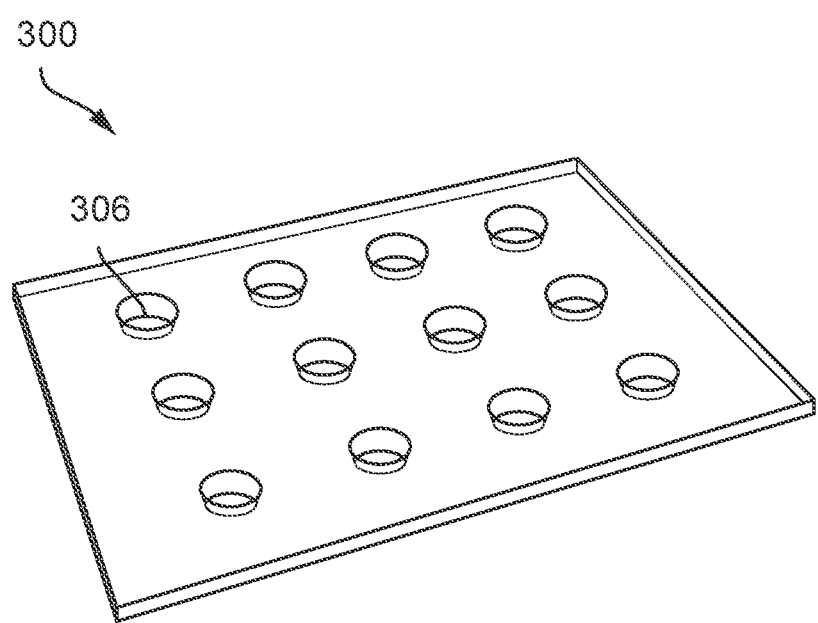
FIG. 7 is a perspective view of the shaped article shown in FIG. 6.

In some embodiments, method 100 comprises depositing a surface modification layer (SML) on sidewalls of the plurality of cavities of the shaped article at step 106 as shown in FIG. 1. For example, method 100 comprises depositing a surface modification layer on a sidewall of each of the plurality of cavities 306 of shaped article 300. FIG. 6 is a cross-sectional schematic view of some embodiments of shaped article 300 comprising surface modification layer 307 deposited on the sidewalls of the plurality of cavities 306, and FIG. 7 is a perspective view of the shaped article. In some embodiments, surface modification layer 307 is formed from a glass material comprising a mobile component. For example, in some embodiments, surface modification layer 307 is formed from a fluorosilicate glass, a borosilicate glass, or a combination thereof. In some embodiments, the mobile component comprises fluorine, boron, phosphorous, or a combination thereof. For example, in some embodiments in which surface modification layer 307 is formed from a fluorosilicate glass, the mobile component comprises, consists essentially of, or consists of fluorine. In some embodiments in which surface modification layer 307 is formed from a borosilicate glass, the mobile component comprises, consists essentially of, or consists of boron. In some embodiments, a fluorosilicate glass and/or a borosilicate glass can be doped with phosphorous. Such glass materials can have a relatively low softening point suitable for use in the methods and apparatus described herein. Additionally, or alternatively, the mobile component of such glass materials can migrate into the shaped article to form a doped surface region with a reduced strain point, annealing point, and/or softening point as described herein.

In some embodiments, the depositing surface modification layer 307 comprises depositing the surface modification layer using flame hydrolysis deposition (FHD), sputtering, sol gel deposition, chemical vapor deposition (CVD), or another suitable deposition technique. In some embodiments, the depositing surface modification layer 307 comprises depositing the surface modification layer using chemical vapor deposition (CVD). For example, the depositing comprises depositing surface modification layer 307 using low pressure chemical vapor deposition (LPCVD), sub-atmospheric chemical vapor deposition (SACVD), or plasma enhanced chemical vapor deposition (PECVD). In some embodiments, the depositing comprises depositing a fluorosilicate glass from $SiF_4$ and $SiH_4$ by CVD. Depositing the surface modification layer by CVD can enable the incorporation of the mobile component in the glass material of the surface modification layer at a sufficiently high concentration for migration of the mobile component into the surface layer of the shaped article as described herein.

In some embodiments, a concentration of the mobile component in the glass material of surface modification layer 307 is at least about 5 wt %, at least about 6 wt %, at least about 7 wt %, at least about 8 wt %, at least about 9 wt %, at least about 10 wt %, or at least about 11 wt %. Additionally, or alternatively, a concentration of the mobile component in the glass material of surface modification layer 307 is at most about 25 wt %. In some embodiments, a concentration of $SiO_2$ in the glass material of surface modification layer 307 is at least about 75 wt %, at least about 80 wt %, at least about 85 wt %, at least about 89 wt %, at least about 90 wt %, at least about 91 wt %, or at least about 92 wt %.

In some embodiments, method 100 comprises migrating at least a portion of the mobile component from the surface modification layer into surface regions of the sidewalls of the shaped article at step 108 as shown in FIG. 1. For example, migrating the mobile component from surface modification layer 307 comprises migrating ions of the mobile component across an interface between the surface modification layer and shaped article 300 such that the surface regions (e.g., regions extending from the interface inward into the shaped article) become doped with the mobile component. Thus, the migrating the mobile component comprises doping the surface regions of shaped article 300 with the mobile component such that the doped surface regions have a higher concentration of the mobile component than a bulk of the shaped article (e.g., undoped regions of the shaped article). In some embodiments, the doped surface regions of shaped article 300 extend from the interface into the shaped article to a depth of at least about 1 µm, at least about 2 µm, at least about 3 µm, at least about 4 µm, at least about 5 µm, at least about 6 µm, at least about 7 µm, at least about 8 µm, at least about 9 µm, at least about 10 µm, at least about 15 µm, at least about 20 µm, at least about 25 µm, at least about 30 µm, at least about 35 µm, at least about 40 µm, at least about 45 µm, or at least about 50 µm. Additionally, or alternatively, the doped surface regions of shaped article 300 extend from the interface into the shaped article to a depth of at most about 100 µm, at most about 90 µm, at most about 80 µm, at most about 70 µm, at most about 60 µm, at most about 50 µm, at most about 40 µm, at most about 30 µm, at most about 20 µm, at most about 10 µm, or at most about 5 µm.

In some embodiments, the doped surface regions comprise a gradient in a concentration of the mobile component. For example, the concentration of the mobile component in the surface regions decreases gradually from the interface with surface modification layer 307 into shaped article 300 (e.g., as a result of the migration). In some embodiments, subsequent to the migrating, the doped surface regions have a reduced strain point, annealing point, and/or softening point compared to the bulk of the shaped article. For example, doping the surface regions with the mobile component can reduce the strain point, annealing point, and/or softening point of the surface regions without substantially changing the strain point, annealing point, and/or softening point of the undoped regions (e.g., the bulk) of the shaped article. For example, it has been found that doping silicate glass (e.g., $SiO_2$, or fused silica) with fluorine can decrease the annealing point of the silicate glass by 113° C./wt % F. Also for example, it has been found that doping silicate glass with boron can decrease the annealing point of the silicate glass by 26° C./wt % $B_2O_3$.

In some embodiments, method 100 comprises reflowing the surface modification layer and the surface regions of the sidewalls at step 110 as shown in FIG. 1. For example, the reflowing comprises causing the glass material of surface modification layer 307 and the glass material, the glass-ceramic material, or the combination thereof of the surface regions (e.g., the doped regions) of shaped article 300 to flow. In some embodiments, the reflowing comprises heating the glass material of the surface modification layer 307 and the glass material, the glass-ceramic material, or the combination thereof of the surface regions (e.g., the doped regions) of shaped article 300 above the softening points of the respective materials such that the materials flow. Such flowing can smooth surface modification layer 307 and/or the interface between the surface modification layer and the sidewalls of shaped article 300, which can enable a reduction in the roughness of the surface modification layer. In some embodiments, a surface roughness of surface modification layer 108 disposed on the sidewalls following the reflowing is less than a surface roughness of the sidewalls prior to the depositing. For example, the surface roughness of the sidewalls prior to the depositing can be at least about 0.5 µm, at least about 1 µm, at least about 2 µm, at least about 3 µm, at least about 4 µm, at least about 5 µm, or at least about 10 µm. Additionally, or alternatively, the surface roughness of surface modification layer 108 disposed on the sidewalls following the reflowing can be at most about 1000 nm, at most about 900 nm, at most about 800 nm, at most about 700 nm, at most about 600 nm, at most about 500 nm, at most about 400 nm, at most about 300 nm, at most about 200 nm, at most about 100 nm, or at most about 50 nm.

The methods described herein comprising doping the surface regions of the shaped article and then reflowing both the surface modification layer and the doped surface regions can enable reduced surface roughness compared to methods comprising depositing a coating (e.g., a glass coating) on the shaped article and reflowing the coating without the doping and the reflowing the surface regions. For example, during the reflowing described herein, smoothing can occur both at the surface of the surface modification layer and at the interface between the surface modification layer and the shaped article. The relatively low strain point, annealing point, and/or softening point of the doped surface regions and the relatively high strain point, annealing point, and/or softening point of the bulk of the shaped article can enable such smoothing without substantial alterations of the size and/or shape of the coated sidewalls. Thus, the geometry of the shaped article can be maintained during the smoothing of the surfaces.

In some embodiments, method 100 comprises heating the surface modification layer to a heating temperature. For example, method 100 comprises heating surface modification layer 307 disposed on the sidewalls of the plurality of cavities 306 and/or the doped surface region of shaped article 300 to the heating temperature for a heating time sufficient to cause the migrating and/or the reflowing as described herein. In some embodiments, the heating comprises heating glass article 300 with surface modification layer 307 disposed thereon (e.g., in an oven or a lehr). In some embodiments, the migrating and the reflowing are caused by a single heating step (e.g., ramping from room temperature to the heating temperature, holding at the heating temperature for the heating time, and ramping from the heating temperature to room temperature). In other embodiments, the migrating is caused by a first heating step, and the reflowing is caused by a second heating step.

Figure 8:
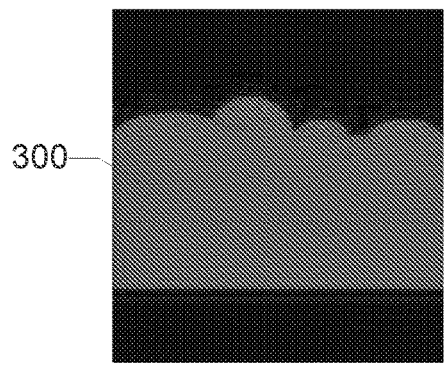
FIGS. 8-11 are close-up cross-sectional schematic views depicting a portion of some embodiments of a shaped article during depositing a surface modification layer and heating.
Figure 9:
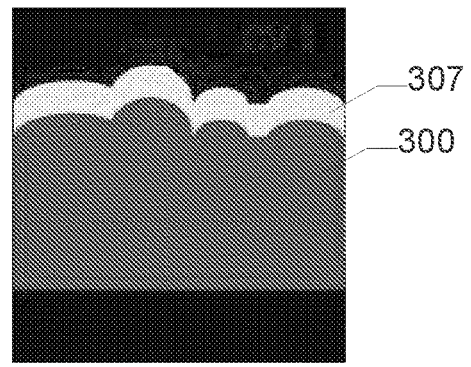
Figure 10:
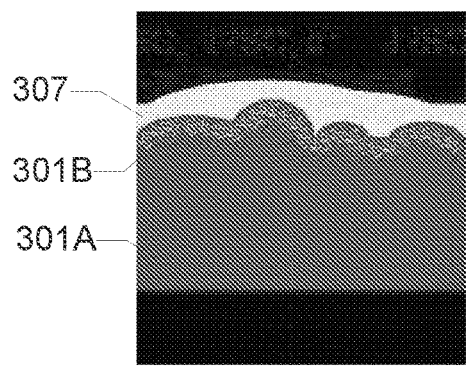
Figure 11:
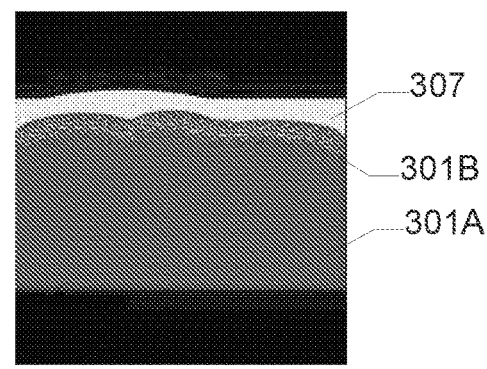

FIGS. 8-11 are close-up cross-sectional schematic views depicting a portion of some embodiments of shaped article 300 during some embodiments of the depositing and the heating. FIG. 8 shows shaped article 300 prior to the depositing. In some embodiments, prior to the depositing, shaped article 300 has a relatively rough surface as described herein. FIG. 9 shows shaped article 300 after the depositing. In some embodiments, after the depositing, surface modification layer 307 is disposed on sidewalls of cavities 306 of shaped article 300. Immediately following the depositing (e.g., prior to the migrating and the reflowing), the surface roughness of surface modification layer 307 can be similar to the surface roughness of the underlying glass article 300 prior to the depositing. FIG. 10 shows shaped article 300 after the migrating. For example, during an initial stage of the heating, ions of the mobile component migrate from surface modification layer 307 into a surface region 301B to dope the surface region as described herein, thereby lowering the strain point, the annealing point, and/or the softening point of the surface region. Subsequent to the migrating, the strain point, the annealing point, and/or the softening point of the surface region is lower than the strain point, the annealing point, and/or the softening point, respectively, of a bulk 301A of shaped article 300. In some embodiments, the reflowing surface modification layer 307 begins during the migrating. For example, the heating temperature during the migrating can be greater than the softening temperature of surface modification layer 307 such that the surface modification layer is able to flow during the migrating. FIG. 11 shows shaped article 300 after the reflowing. For example, during a subsequent stage of the heating (e.g., following the initial stage or during a separate heating step), surface modification layer 307 and the doped surface region 301B can reflow, thereby lowering the surface roughness of the surface modification layer and the interface between the surface modification layer and shaped article 300 as shown in FIG. 11. In some embodiments, bulk 301A of shaped article 300 does not substantially reflow during the reflowing step (e.g., as a result of the higher strain point, annealing point, and/or softening point of the bulk of the shaped article compared to the doped surface region 301B).

In some embodiments, the heating temperature is greater than a softening point of surface modification layer 307. Additionally, or alternatively, the heating temperature is greater than a softening point of at least a portion of the doped surface region of shaped article 300 (e.g., a portion of the doped surface region near the interface between surface modification layer 307 and the shaped article with a relatively high concentration of the mobile component). Additionally, or alternatively, the heating temperature is less than the softening point of the bulk of shaped article 300. In some embodiments, the heating temperature is at least about 10° C. below, at least about 20° C. below, at least about 30° C. below, at least about 40° C. below, at least about 50° C. below, at least about 60° C. below, at least about 70° C. below, at least about 80° C. below, at least about 90° C. below, or at least about 100° C. below the softening point of the bulk of shaped article 300. In some embodiments, the softening point of the bulk of shaped article 300 (e.g., the shaped article prior to the depositing) is at least about 600° C., at least about 610° C., at least about 620° C., at least about 630° C., at least about 640° C., at least about 650° C., at least about 660° C., at least about 670° C., at least about 680° C., at least about 690° C., at least about 700° C., at least about 750° C., at least about 800° C., at least about 850° C., or at least about 900° C. Additionally, or alternatively, the softening point of the bulk of shaped article 300 is at most about 1300° C., at most about 1200° C., at most about 1100° C., at most about 1000° C., at most about 900° C., at most about 800° C., or at most about 700° C. In some embodiments, the softening point of surface modification layer 307 is at least about 10° C. below, at least about 20° C. below, at least about 30° C. below, at least about 40° C. below, at least about 50° C. below, at least about 60° C. below, at least about 70° C. below, at least about 80° C. below, at least about 90° C. below, or at least about 100° C. below the softening point of the bulk of shaped article 300. In some embodiments, the softening point of surface modification layer 307 is at least about 300° C., at least about 350° C., at least about 400° C., at least about 450° C., at least about 500° C., at least about 550° C., or at least about 600° C. Additionally, or alternatively, the softening point of surface modification layer 307 is at most about 900° C., at most about 800° C., at most about 700° C., at most about 600° C., at most about 550° C., or at most about 500° C. In some embodiments, the heating temperature is at least about 600° C., at least about 610° C., at least about 620° C., at least about 630° C., at least about 640° C., at least about 650° C., at least about 660° C., at least about 670° C., at least about 680° C., at least about 690° C., at least about 700° C., at least about 750° C., at least about 800° C., at least about 850° C., or at least about 900° C. Additionally, or alternatively, the heating temperature is at most about 1300° C., at most about 1200° C., at most about 1100° C., at most about 1000° C., at most about 900° C., at most about 800° C., or at most about 700° C.

The heating temperature between the softening point of the surface modification layer and the softening point of the bulk of the shaped article can enable migration of the mobile component of the glass material of the surface modification layer, reflowing of the surface modification layer, and/or reflowing of the doped surface region of the shaped article without substantially altering the size and/or shape of the underlying bulk of the shaped article, which can enable smoothing of the cavity surfaces without substantially deforming the cavities. In some embodiments, the heating time is at least about 5 minutes, at least about 6 minutes, at least about 7 minutes, at least about 8 minutes, at least about 9 minutes, at least about 10 minutes, at least about 15 minutes, at least about 20 minutes, at least about 25 minutes, or at least about 30 minutes. Additionally, or alternatively, the heating time is at most about 1 hour.

In some embodiments, a thickness of surface modification layer 307, before or after the migrating and/or the reflowing, is at least about 500 nm, at least about 600 nm, at least about 700 nm, at least about 800 nm, at least about 900 nm, at least about 1000 nm, at least about 1100 nm, at least about 1200 nm, at least about 1300 nm, at least about 1400 nm, at least about 1500 nm, at least about 1600 nm, at least about 1700 nm, at least about 1800 nm, at least about 1900 nm, at least about 2000 nm, at least about 2500 nm, or at least about 3000 nm. Additionally, or alternatively, the thickness of surface modification layer 307, before or after the migrating and/or the reflowing, is at most about 10 μm, at most about 9 μm, at most about 8 μm, at most about 7 μm, at most about 6 μm, or at most about 5 μm. It has been observed that a thicker surface modification layer can reflow at a lower temperature.

In some embodiments, method 100 comprises etching the surface modification layer. For example, method 100 comprises contacting surface modification layer 307 with an etchant subsequent to the migrating and/or the reflowing. In some embodiments, the etchant comprises an aluminum etchant. For example, the etchant comprises a Type A aluminum etchant. During the migrating and/or the reflowing, mobile components present in the glass material, the glass-ceramic material, or the combination thereof of shaped article 300 can migrate into surface modification layer 307. For example, in embodiments in which shaped article 300 is formed from an alkali aluminosilicate glass composition, mobile components, such as alkali components, present in the shaped article can migrate into surface modification layer 307 during the heating as described herein. Such migration can result in formation of salts (e.g., alkali fluoride salts) in surface modification layer 307, including at the surface of the surface modification layer. In some embodiments, the etching dissolves the salts present on the surface of surface modification layer 307 without substantially dissolving the glass material of the surface modification layer and/or the glass material, the glass-ceramic material, or the combination thereof of shaped article 300. Such etching can help to preserve the smoothness of the surface modification layer (e.g., by removing salts that can increase the roughness of the surface).

In some embodiments, cavities 306 have a diameter or width, before or after the deposition, the migrating, the reflowing, and/or the etching, of at most about 5 mm, at most about 4 mm, at most about 3 mm, at most about 2 mm, or at most about 1 mm. Additionally, or alternatively, cavities 306 have a diameter or width, before or after the deposition, the migrating, the reflowing, and/or the etching, of at least about 0.5 mm or at least about 1 mm. The diameter or width of cavities 306 can refer to the diameter or width at first surface 302 of shaped article 300 and/or second surface 304 of the shaped article. Such small cavities with smooth and/or straight sidewalls can be enabled by the methods described herein. In some embodiments, the number of cavities 406 in the plurality of cavities can be at least 100, at least 200, at least 300, at least 400, at least 500, at least 600, at least 700, at least 800, at least 900, at least 1000, at least 1100, at least 1200, at least 1300, at least 1400, or at least 1500. Such a large number of cavities on a single shaped article can enable large-scale production of devices, such as liquid lenses, using wafer manufacturing techniques. In some embodiments, the sidewalls of cavities 306 of shaped article 300, before or after the deposition, the migrating, the reflowing, and/or the etching, are substantially straight. For example, the deviation of the sidewalls of cavities 306 from linear is within +/−0.25 μm/mm along the sidewall through a thickness of shaped article 300. In some embodiments, cavities 306 have a truncated conical shape with smooth and substantially straight sidewalls.

In some embodiments, method 100 comprises singulating the shaped article at step 112 as shown in FIG. 1. For example, singulating shaped article 300 comprises separating the shaped article into two or more shaped sub-articles following the forming, the polishing, the depositing, the migrating, the reflowing, and/or the etching. In some embodiments, singluating shaped article 300 comprises cutting or breaking the shaped article along one or more cutting paths. In some embodiments, singulating shaped article 300 comprises dicing the shaped article (e.g., with a mechanical dicing saw, a laser, or another suitable cutting device). For example, the singulating comprises dicing shaped article 300 to form a plurality of shaped sub-articles, and each sub-article comprises a single cavity 406. Such shaped sub-articles can be used to form liquid lenses as described herein.

Figure 12:
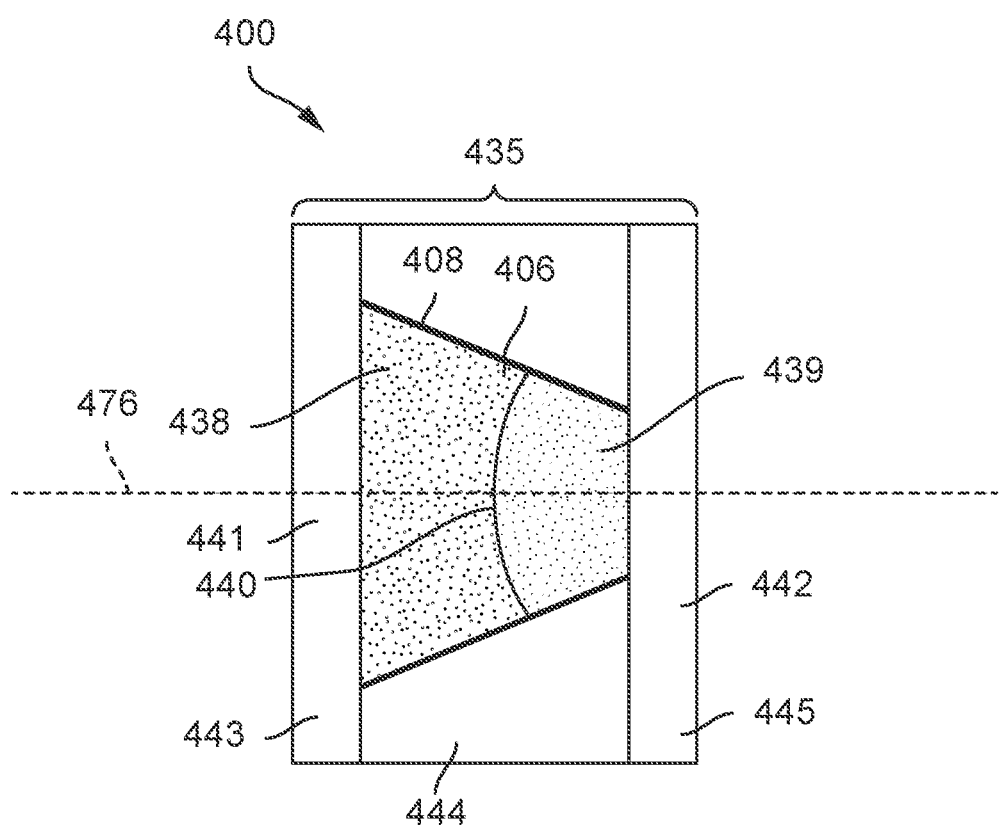
FIG. 12 is a cross-sectional schematic view of some embodiments of a liquid lens comprising a shaped article.

In some embodiments, the methods described herein can be used to manufacture liquid lenses. FIG. 12 is a cross-sectional schematic view of some embodiments of a liquid lens 400 incorporating shaped article 300. In some embodiments, liquid lens 400 comprises a lens body 435 and a cavity 406 formed in the lens body. In some embodiments, a surface modification layer 408 is disposed on a sidewall of cavity 406. Thus, the sidewall of cavity 406 is a coated sidewall. A first liquid 438 and a second liquid 439 are disposed within cavity 406. In some embodiments, first liquid 438 is a polar liquid or a conducting liquid. Additionally, or alternatively, second liquid 439 is a non-polar liquid or an insulating liquid. In some embodiments, first liquid 438 and second liquid 439 are immiscible with each other and have different refractive indices such that an interface 440 between the first liquid and the second liquid forms a lens. Interface 440 can be adjusted via electrowetting. For example, a voltage can be applied between first liquid 438 and a surface of cavity 406 (e.g., an electrode positioned near the surface of the cavity and insulated from the first liquid) to increase or decrease the wettability of the surface of the cavity with respect to the first liquid and change the shape of interface 440. In some embodiments, adjusting interface 440 changes the shape of the interface, which changes the focal length or focus of liquid lens 400. For example, such a change of focal length can enable liquid lens 400 to perform an autofocus (AF) function. Additionally, or alternatively, adjusting interface 440 tilts the interface relative to an optical axis 476. For example, such tilting can enable liquid lens 400 to perform an optical image stabilization (OIS) function. Such adjustment of interface 440 via electrowetting can be sensitive to surface roughness and/or non-linearity of the sidewalls of cavity 406. Thus, the methods described herein for forming shaped article 300 having cavities 306 with smooth and/or substantially straight sidewalls may be beneficial for forming cavity 406 for liquid lens 400. In some embodiments, first liquid 438 and second liquid 439 have substantially the same density, which can help to avoid changes in the shape of interface 440 as a result of changing the physical orientation of liquid lens 400 (e.g., as a result of gravitational forces).

In some embodiments, lens body 435 of liquid lens 400 comprises a first window 441 and a second window 442. In some of such embodiments, cavity 406 is disposed between first window 441 and second window 442. In some embodiments, lens body 435 comprises a plurality of layers that cooperatively form the lens body. For example, in the embodiments shown in FIG. 12, lens body 435 comprises a cap 443, a shaped plate 444, and a base 445. In some embodiments, shaped plate 444 with cavity 406 comprises or is formed from shaped article 300 with cavity 306. For example, shaped plate 444 with cavity 406 is formed as described herein with reference to shaped article 300 with cavity 306, cap 443 is bonded to one side (e.g., an object side) of the shaped plate, and base 445 is bonded to the other side (e.g., an image side) of the shaped plate such that the cavity is covered on opposing sides by the cap and the base. Thus, a portion of cap 443 covering cavity 406 serves as first window 441, and a portion of base 445 covering the cavity serves as second window 442. In other embodiments, the cavity is a blind hole that does not extend entirely though the shaped plate. In such embodiments, the base can be omitted, and the closed end of the cavity can serve as the second window.

In some embodiments, cavity 406 has a truncated conical shape as shown in FIG. 12 such that a cross-sectional area of the cavity decreases along optical axis 476 in a direction from the object side to the image side. Such a tapered cavity can help to maintain alignment of interface 440 between first liquid 438 and second liquid 439 along optical axis 476. In other embodiments, the cavity is tapered such that the cross-sectional area of the cavity increases along the optical axis in the direction from the object side to the image side or non-tapered such that the cross-sectional area of the cavity remains substantially constant along the optical axis.

In some embodiments, image light enters liquid lens 400 through first window 441, is refracted at interface 440 between first liquid 438 and second liquid 439, and exits the liquid lens through second window 442. In some embodiments, cap 443 and/or base 445 comprise a sufficient transparency to enable passage of image light. For example, cap 443 and/or base 445 comprise a polymeric material, a glass material, a ceramic material, a glass-ceramic material, or a combination thereof. In some embodiments, outer surfaces of cap 443 and/or base 445 are substantially planar. Thus, even though liquid lens 400 can function as a lens (e.g., by refracting image light passing through interface 440), outer surfaces of the liquid lens can be flat as opposed to being curved like the outer surfaces of a fixed lens. In other embodiments, outer surfaces of the cap and/or the base are curved. Thus, the liquid lens comprises an integrated fixed lens. In some embodiments, shaped plate 444 comprises a glass material, a glass-ceramic material, or a combination thereof as described herein. Because image light can pass through the cavity through shaped plate 444, the shaped plate may or may not be transparent.

Although FIG. 12 illustrates a single liquid lens 400, liquid lenses can be manufactured in arrays using a wafer manufacturing process as described herein. For example, a liquid lens array comprises a plurality of liquid lenses 400 attached in a plate or wafer. Thus, prior to singulation to form single liquid lens 400, shaped plate 444 comprises a plurality of cavities 406. Additionally, or alternatively, prior to singulation, cap 443 comprises a plate with a plurality of first windows 441 corresponding to the plurality of cavities 406. Additionally, or alternatively, prior to singulation, base 445 comprises a plate with a plurality of second windows 442 corresponding to the plurality of cavities 406. After formation, the liquid lens array can be singulated to form the individual liquid lenses 400.

Figure 13:
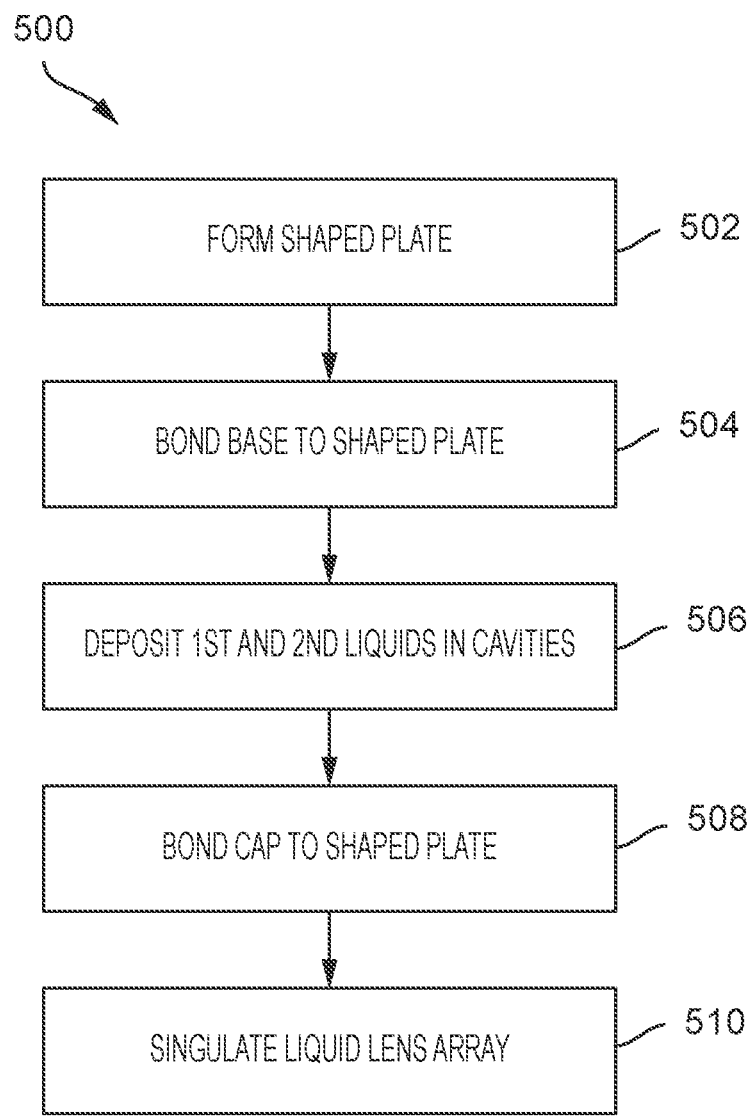
FIG. 13 is a flowchart representing some embodiments of a method for manufacturing a liquid lens.

FIG. 13 is a flowchart representing some embodiments of a method 500 for manufacturing a liquid lens. In some embodiments, method 500 comprises forming a shaped plate comprising a plurality of cavities. For example, method 500 comprises forming shaped plate 444 comprising the plurality of cavities 406 at step 502 (e.g., as described herein with reference to forming shaped article 300 comprising the plurality of cavities 306).

In some embodiments, method 500 comprises bonding a base to a surface of the shaped plate. For example, method 500 comprises bonding base 445 to shaped plate 444 at step 504. The bonding comprises, for example, laser bonding, adhesive bonding, or another suitable bonding technique.

In some embodiments, method 500 comprises depositing first and second liquids into the plurality of cavities of the shaped plate. For example, method 500 comprises depositing first liquid 438 and second liquid 439 in each of the plurality of cavities 406 of shaped plate 444 at step 506.

In some embodiments, method 500 comprises bonding a cap to a surface of the shaped plate to seal the first liquid and the second liquid within the plurality of cavities and form a liquid lens array. For example, method 500 comprises bonding cap 443 to shaped plate 444 to seal first liquid 438 and second liquid 439 within the plurality of cavities 406 of the shaped plate at step 508. The bonding comprises, for example, laser bonding, adhesive bonding, or another suitable bonding technique.

In some embodiments, method 500 comprises singulating the liquid lens array to form a plurality of individual liquid lenses. For example, method 500 comprises singulating the liquid lens array comprising cap 443, shaped plate 444, and optionally, base 445 to form the plurality of individual liquid lenses 400 at step 510. The singulating comprises, for example, mechanical dicing, laser dicing, or another suitable dicing technique.

The methods described herein for forming shaped articles with a plurality of cavities formed therein can enable large-scale production of shaped plates having cavities with sufficiently smooth surfaces to be used in electrowetting applications, which in turn, can enable efficient manufacturing of liquid lens arrays and/or singulated liquid lenses.

Although FIG. 13 illustrates using the methods described herein to manufacture liquid lenses, other embodiments are included in this disclosure. For example, in other embodiments, the methods and apparatus described herein can be used to make shaped articles for use in optics, biological, microfluidic, or any other suitable applications.

EXAMPLES

Various embodiments will be further clarified by the following examples.

Throughout the examples, a fluorosilicate glass (FSG) film having the thickness described below was deposited onto a sidewall of a conical cavity formed in a glass substrate. The cavity had a 30° sidewall formed by a laser damage and etch process, resulting in a surface roughness of about 5 μm as formed. The glass substrate was formed from an alkali-aluminosilicate glass commercially available as Corning® Gorilla® Glass from Corning Incorporated (Corning, N.Y.) and had a strain point of 563° C., an annealing point of 613° C., and a softening point of 852° C. The FSG film was deposited from a mixture of $SiF_4$ and $SiH_4$ using high density plasma chemical vapor deposition (HDPCVD) in equipment from Plasma-Therm (Saint Petersburg, Fla.) using 28 sccm $SiH_4$—$SiF_4$ mixture, 56 sccm 02, and 20 sccm Ar at 5 mT with 600 W 2 MHz RF applied to the coil and 25 W 13.56 MHz RF bias applied to the platen. The substrate temperature during the deposition was 150° C.

Example 1

A 2000 nm FSG film with an estimated 11 wt % F was deposited as described above. After deposition, the coated substrate was heated to a heating temperature of 650° C. in flowing $N_2$ and held at 650° C. for a heating time of 30 minutes in flowing $N_2$.

Example 2

A 2000 nm FSG film with an estimated 11 wt % F was deposited as described above. After deposition, the coated substrate was heated to a heating temperature of 700° C. in flowing $N_2$ and held at 700° C. for a heating time of 30 minutes in flowing $N_2$.

Example 3

A 2000 nm FSG film with an estimated 11 wt % F was deposited as described above. After deposition, the coated substrate was heated to a heating temperature of 725° C. in flowing $N_2$ and held at 725° C. for a heating time of 30 minutes in flowing $N_2$.

Example 4

A 2000 nm FSG film with an estimated 11 wt % F was deposited as described above. After deposition, the coated substrate was heated to a heating temperature of 750° C. in flowing $N_2$ and held at 750° C. for a heating time of 30 minutes in flowing $N_2$.

Example 5

A 2000 nm FSG film with an estimated 11 wt % F was deposited as described above. After deposition, the coated substrate was heated to a heating temperature of 800° C. in flowing $N_2$ and held at 800° C. for a heating time of 10 minutes in flowing $N_2$.

Example 6

A 2000 nm FSG film with an estimated 11 wt % F was deposited as described above. After deposition, the coated substrate was heated to a heating temperature of 850° C. in flowing $N_2$ and held at 850° C. for a heating time of 8 minutes in flowing $N_2$.

Following the heating, salts were observed in and on the FSG film, and bubbles were observed within the FSG film.

Example 7

A 5000 nm FSG film with an estimated 11 wt % F was deposited as described above. After deposition, the coated substrate was heated to a heating temperature of 700° C. in flowing $N_2$ and held at 700° C. for a heating time of 30 minutes in flowing $N_2$.

Example 8

A 5000 nm FSG film with an estimated 11 wt % F was deposited as described above. After deposition, the coated substrate was heated to a heating temperature of 750° C. in flowing $N_2$ and held at 750° C. for a heating time of 30 minutes in flowing $N_2$.

Following the heating, salts were observed in and on the FSG film, and bubbles were observed within the FSG film.

Example 9

A 5000 nm FSG film with an estimated 11 wt % F was deposited as described above. After deposition, the coated substrate was heated to a heating temperature of 800° C. in flowing $N_2$ and held at 800° C. for a heating time of 30 minutes in flowing $N_2$.

Following the heating, salts were observed in and on the FSG film, and bubbles were observed within the FSG film.

As the heating temperature was increased in Examples 1-6, the surface roughness of the resulting coated cavity sidewall was found to decrease. Thus, Examples 1-6 illustrate that increasing the heating temperature can reduce the surface roughness of the coated cavity sidewall. However, salts were observed to form in and on the FSG layer, and bubbles were observed within the FSG layer at a heating temperature of 850° C. (Example 6). The salts are believed to have been formed by the reaction of fluorine from the FSG layer with alkali components from the glass substrate. The bubbles are believed to be blisters formed by the reaction of fluorine from the FSG layer with water, carbon, or other constituents in the glass substrate and/or at the interface between the FSG layer and the glass substrate to form volatile species.

As the heating temperature was increased in Examples 7-9, the surface roughness of the resulting coated cavity sidewall was found to decrease. Thus, Examples 7-9 again illustrate that increasing the heating temperature can reduce the surface roughness of the coated cavity sidewall. However, salts were observed to form in and on the FSG layer, and bubbles were observed within the FSG layer at a heating temperature of 750° C. (Examples 8 and 9).

Comparing Examples 7-9 to Examples 1-6, salts and bubbles were observed in and on the thicker FSG layer of Examples 7-9 at a lower temperature than the thinner FSG layer of Examples 1-6. In both cases, the salts were removed with a 5 minute etch in room temperature Type A aluminum etchant.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A shaped article comprising:
    a plate comprising a glass material, a glass-ceramic material, or a combination thereof;
    a plurality of cavities formed in the plate; and
    a surface modification layer disposed on sidewalls of the plurality of cavities, the surface modification layer comprising a glass material comprising a mobile component;
    wherein doped regions of the plurality of cavities adjacent the surface modification layer comprise a gradient in a concentration of the mobile component.
2. The shaped article of claim 1, wherein the surface modification layer disposed on the sidewalls has a thickness of at least about 1000 nm.

3. The shaped article of claim 1, wherein a concentration of the mobile component in the glass material of the surface modification layer is at least about 10 wt %.

4. The shaped article of claim 1, wherein a surface roughness of the surface modification layer disposed on the sidewalls is at most about 500 nm.

5. The shaped article of claim 1, wherein the glass material of the surface modification layer comprises a fluorosilicate glass, and the mobile component comprises fluorine.

6. The shaped article of claim 1, wherein the glass material of the surface modification layer comprises a borosilicate glass, and the mobile component comprises boron.

7. The shaped article of claim 1, wherein the glass material, the glass-ceramic material, or the combination thereof of the shaped article comprises a silicate glass, a silicate glass-ceramic, or a combination thereof.

8. The shaped article of claim 1, wherein the gradient in the concentration of the mobile component is a result of migration of at least a portion of the mobile component from the surface modification layer into surface regions of the sidewalls of the shaped article to form the doped regions.

9. The shaped article of claim 1, wherein a softening point of the glass material of the surface modification layer is less than a softening point of the glass material, the glass-ceramic material, or the combination thereof of the shaped plate.

10. The shaped article of claim 1, wherein:
the surface modification layer disposed on the sidewalls of the plurality of cavities defines coated sidewalls of the plurality of cavities;
each of the plurality of cavities has a truncated conical shape; and
the coated sidewall of each of the plurality of cavities is substantially straight.

11. A method comprising:
depositing a surface modification layer on sidewalls of a plurality of cavities of a shaped article, the surface modification layer comprising a glass material comprising a mobile component, the shaped article comprising a glass material, a glass-ceramic material, or a combination thereof;
migrating at least a portion of the mobile component from the surface modification layer into surface regions of the sidewalls of the shaped article, whereby subsequent to the migration, the surface regions have a reduced annealing point compared to a bulk of the shaped article; and
reflowing the surface modification layer and the surface regions of the sidewalls;
wherein a surface roughness of the surface modification layer disposed on the sidewalls following the reflowing is less than a surface roughness of the sidewalls prior to the depositing.

12. The method of claim 11, wherein the glass material of the surface modification layer comprises a fluorosilicate glass, and the mobile component comprises fluorine.

13. The method of claim 11, wherein the glass material of the surface modification layer comprises a borosilicate glass, and the mobile component comprises boron.

14. The method of claim 11, wherein the glass material, the glass-ceramic material, or the combination thereof of the shaped article comprises a silicate glass, a silicate glass-ceramic, or a combination thereof.

15. The method of claim 11, wherein the depositing comprises depositing the surface modification layer on the sidewalls using chemical vapor deposition.

16. The method of claim 11, comprising heating the surface modification layer to a heating temperature for a heating time sufficient to cause the migrating and the reflowing.

17. The method of claim 16, wherein the heating temperature is less than a softening point of the bulk of the shaped article.

18. A liquid lens comprising:
a lens body comprising a first window, a second window, a cavity disposed between the first window and the second window, and a surface modification layer disposed on a sidewall of the cavity, the lens body comprising a glass material, a glass-ceramic material, or a combination thereof, the surface modification layer comprising a glass material comprising a mobile component, a doped region of the cavity adjacent the surface modification layer comprising a gradient in a concentration of the mobile component; and
a first liquid and a second liquid disposed within the cavity of the lens body, the first liquid and the second liquid substantially immiscible with each other and having different refractive indices such that an interface between the first liquid and the second liquid forms a lens.

19. The liquid lens of claim 18, wherein:
the glass material of the surface modification layer comprises a fluorosilicate glass, a borosilicate glass, or a combination thereof; and
the mobile component comprises fluorine, boron, or a combination thereof, respectively.

20. The liquid lens of claim 18, wherein the glass material, the glass-ceramic material, or the combination thereof of the shaped article comprises a silicate glass, a silicate glass-ceramic, or a combination thereof.

* * * * *